(12) United States Patent
Kumagai

(10) Patent No.: US 7,163,231 B2
(45) Date of Patent: Jan. 16, 2007

(54) CURTAIN AIRBAG

(75) Inventor: Masayoshi Kumagai, Shiga (JP)

(73) Assignee: Takata Corporation, Tokyo (JP)

( * ) Notice: Subject to any disclaimer, the term of this patent is extended or adjusted under 35 U.S.C. 154(b) by 148 days.

(21) Appl. No.: 10/248,476

(22) Filed: Jan. 22, 2003

(65) Prior Publication Data
US 2003/0184057 A1    Oct. 2, 2003

(30) Foreign Application Priority Data
Feb. 12, 2002    (JP)    ............... 2002-034125

(51) Int. Cl.
*B60R 21/20*    (2006.01)
(52) U.S. Cl. ............... 280/730.2; 280/728.3
(58) Field of Classification Search ............ 280/728.3, 280/730.2, 728.2, 743.1
See application file for complete search history.

(56) References Cited

U.S. PATENT DOCUMENTS

| | | | |
|---|---|---|---|
| 5,899,486 A * | 5/1999 | Ibe | 280/728.2 |
| 6,022,044 A * | 2/2000 | Cherry | 280/730.2 |
| 6,095,551 A * | 8/2000 | O'Docherty | 280/730.2 |
| 6,220,623 B1 * | 4/2001 | Yokota | 280/728.2 |
| 6,517,110 B1 * | 2/2003 | Butters et al. | 280/749 |
| 6,626,457 B1 * | 9/2003 | Masuda et al. | 280/728.2 |

FOREIGN PATENT DOCUMENTS

| | | |
|---|---|---|
| GB | 2 309 942 A | 3/1997 |
| GB | 2 331 491 A | 5/1999 |
| JP | 11-321532 | 11/1999 |
| JP | 2000-079864 | 3/2000 |

* cited by examiner

*Primary Examiner*—David R. Dunn
(74) *Attorney, Agent, or Firm*—Foley & Lardner LLP

(57) ABSTRACT

A curtain airbag includes a curtain airbag body folded to have a long substantially elliptic-cylindrical sectional shape and a cover covering the curtain airbag body. On a side surface of the cover, openings are formed at intervals in the longitudinal direction of a folded formation of the curtain airbag body. Through the openings, the curtain airbag body can be visually observed from outside the cover.

20 Claims, 5 Drawing Sheets

(PRIOR ART)

CURTAIN AIRBAG

BACKGROUND

The present invention relates to a curtain airbag (which is also called an inflatable curtain), an extendable curtain, an airbag for protecting a head, and more specifically, it relates to a curtain airbag being extendable along the side of a vehicle occupant, especially along a upper body including the head.

An example of a conventional curtain airbag (Japanese Unexamined Patent Application Publication No. 2000-79864) is described with reference to FIGS. 4(a)–4(c) and 5 as follows.

In order to protect a head of a vehicle occupant at a side-on collision or rolling of an automobile, a curtain airbag body 1 is attached to a roof side rail 2 of the automobile. The curtain airbag body 1 is formed to have a bag like shape by overlapping two sheets of cloth so as to suture them together with sewing thread.

At the top of the curtain airbag body 1, there is provided an auriform affixing portion 3 projectingly arranged upwardly, and the affixing portion 3 is provided with a bolt insertion hole 4.

The curtain airbag body 1 is folded to have an elongated bar-shape called as a folded formation 1F. The folded formation 1F is banded together with an H-shaped sheet 5. The sheet 5 is made of paper, synthetic-resin impregnated paper, a synthetic resin sheet. The sheet 5 comprises looping portions 6 and 6 looping around the folded formation 1F, a tying portion 7 connecting between the looping portions 6 and 6, a protruded piece 8 projectingly arranged from the tying portion 7, and a bolt insertion hole 9 formed on the protruded piece 8.

In a state that the protruded piece 8 is overlapped on the affixing portion 3 and the bolt insertion holes 4 and 9 are in agreement with each other, the looping portions 6 are looped around the folded formation 1F as indicated by arrows A of FIG. 4(c) and ends of the looping portion 6 are bonded together with adhesive tape or an adhesive.

By looping the sheet 5 around the folded formation 1F in such a manner, toughness is produced in the folded formation 1F. Therefore, the folded formation 1F of the curtain airbag body 1 can be simply attached to the roof side rail 2 by a worker or a working robot who grasps a portion looped with the sheet 5 to adjust the bolt insertion holes 4 and 9 to female-screw holes of the roof side rail 2 and to screw bolts 18 into the female-screw holes through the bolt insertion holes 4 and 9.

As shown in FIG. 5, the respective affixing portions 3 arranged in the curtain airbag body 1 are fixed to the roof side rail 2 with the bolts 18. At the rear end of the curtain airbag body 1, an inflator 10 is inserted. The inflator 10 and the rear end of the curtain airbag body 1 are fixed to a C pillar 13 with a bracket 11 and bolts 12. Numeral 14 denotes a B pillar; numeral 15 denotes an A pillar.

When the inflator 10 is operated to supply gas into the curtain airbag body 1, the looping portion 6 is peeled off the adhesive interface, so that the curtain airbag body 1 is inflated along a vehicle door as shown by a phantom line 1' of FIG. 5 and is extended on the side of a head of a vehicle occupant like a curtain.

The curtain airbag body 1 is arranged along from the A pillar 15 to the C pillar 13; the curtain airbag body 1 may be arranged only between the A pillar and the B pillar, and between the B pillar and the C pillar.

As described above, the curtain airbag body 1 is substantially in an exposed state and it may possibly be worn during transportation or by being ground with vehicle body members such as a roof garnish after being attached to the vehicle body, so that a material sufficiently resistant to the abrasion has to be selected for the curtain airbag body 1.

Then, the curtain airbag body 1 may be covered with a cover, which is to be cleaved when the curtain airbag body 1 is inflated.

However, if the curtain airbag body 1 is covered in such a manner, the folded and accommodated state of the curtain airbag body 1 cannot be directly observed visually, so that the confirmation of such a state has to be relied on by indirect observing means such as confirmation by touching with a hand, reducing working efficiency.

SUMMARY OF INVENTION

It is an object of the present invention to provide a curtain airbag that is protected by being covered with a cover while a folded and accommodated state within the cover can be directly and visually observed.

A curtain airbag according to an embodiment of the present invention comprises a curtain airbag body extendable along a side wall of a cabin, and a cover for covering the folded curtain airbag body. The cover is provided with a plurality of openings formed at predetermined intervals in the longitudinal direction of the curtain airbag for observing the curtain airbag body within the cover.

In the curtain airbag according to an embodiment of the present invention, since the curtain airbag body 1 is covered with the cover, the curtain airbag body 1 is protected from being worn during transportation or after being attached to a vehicle body. Therefore, the resistance to wear demanded for the curtain airbag body can be alleviated.

In the curtain airbag according to embodiments of the present invention, since the cover is provided with a plurality of openings, the curtain airbag body within the cover can be directly observed through the openings, so that the folded and accommodated state in the cover of the curtain airbag body can be visually observed. In particular, the curtain airbag body may be often folded so that creases extend in the longitudinal direction of the folded formation (the longitudinal direction of a vehicle body when being attached to the body). Therefore, if the plurality of openings are formed at predetermined intervals in the longitudinal direction of the curtain airbag, the creases of the curtain airbag body and overlapped streaks produced along the creases are visible over a wide range in the longitudinal direction of the curtain airbag, so that the folded and accommodated state of the curtain airbag body can be easily observed. Accordingly, the accommodating operation of the curtain airbag body within the cover and the operation confirming the state of the curtain airbag body after being attached to the vehicle body can be accomplished more quickly.

According to embodiments of the present invention, the openings may be preferably arranged so as to overlap with at least one streak crease line in the longitudinal direction of the curtain airbag body. The curtain airbag body may be often folded so that creases extend in the longitudinal direction, as mentioned above. Therefore, by visually observing that the creases of the curtain airbag body and overlapped streaks produced along the creases extend so as to cross the respective openings, the quality of the folded and accommodated state of the curtain airbag body can be observed at a glance.

In particular, if the openings are longer than are wide in a direction crossing the longitudinal direction of the curtain airbag body, a plurality of the creases or the overlapped streaks can easily cross one opening, enabling working efficiency of the visual observation and the accuracy in confirmation to be improved.

According to the present invention, the openings may preferably be arranged on a surface being visible from the cabin in a state that the curtain airbag is attached to a vehicle body. If so, even after the curtain airbag is attached to the vehicle body, the state of the curtain airbag body can be visually observed from the cabin through the openings, extremely improving the efficiency in the visual observation after the curtain airbag is attached to the vehicle body.

Other objects, advantages and novel features of the present invention will become apparent from the following detailed description of the invention when considered in conjunction with the accompanying drawings.

DETAILED DESCRIPTION

Figure 1:
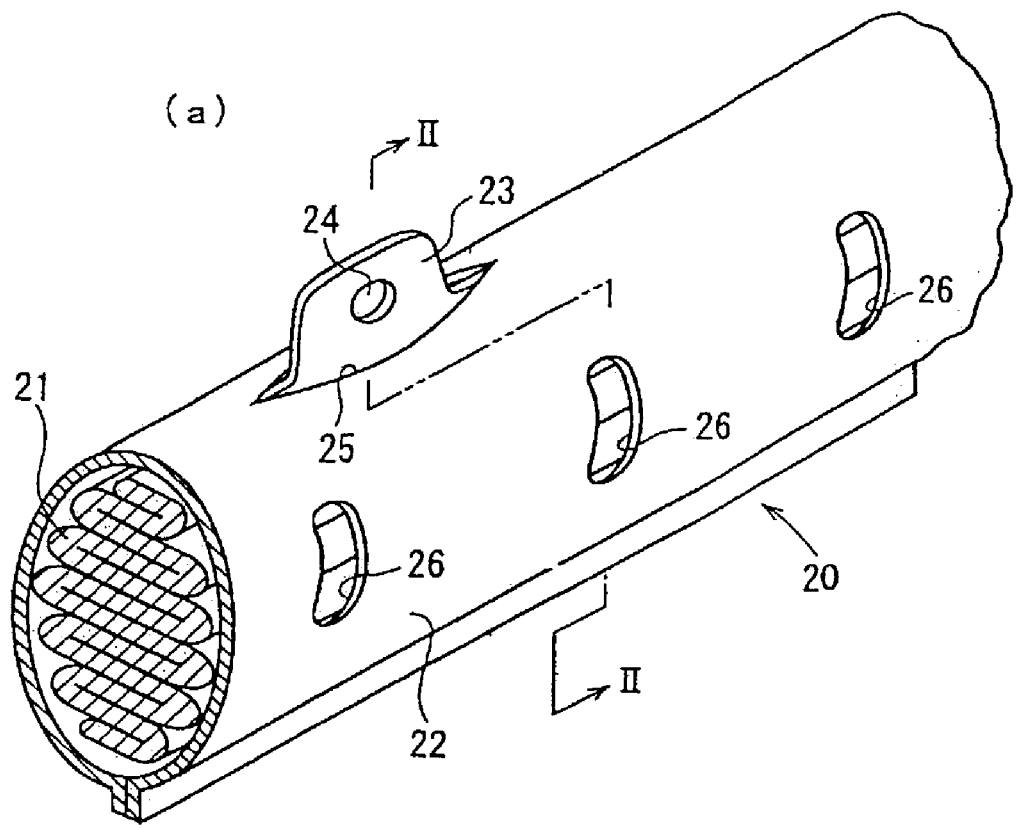
FIG. 1(a) is a perspective sectional view of a curtain airbag according to an embodiment.
FIG. 1(b) is a perspective sectional view of a curtain airbag body of the curtain airbag.
Figure 1:
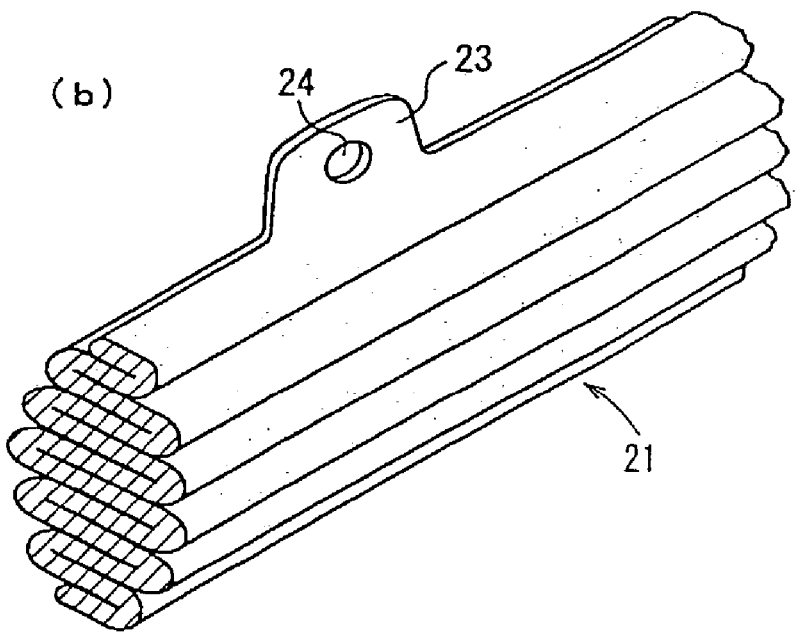

An embodiment will be described below with reference to the drawings. FIGS. 1(a) and 1(b) provide a perspective view of a curtain airbag according to the embodiment and FIGS. 2(a) and 2(b) provide a cross-sectional view of the curtain airbag.

A curtain airbag 20 includes a curtain airbag body 21 fan-folded to have a long substantially elliptic-cylindrical sectional shape and a cover 22 covering the curtain airbag body 21. A folded surface of the curtain airbag body 21 is substantially horizontal. Therefore, the creases and the overlapped streaks of the curtain airbag body 21 are exposed on the side surfaces of the folded formation of the curtain airbag body 21.

The curtain airbag body 21, as shown in FIG. 2(b), is fabricated to have a bag-shape by overlapping two base cloths 21a and 21b and connecting edges of them together with suture thread 21c. In addition, instead of the suture, another connecting means such as adhesion and fusion may also be adopted. Also, in order that the thickness of the curtain airbag body 21 when being inflated (the lateral width in FIG. 2(b)) is not allowed to be excessive; or in order to form a gas passage or a small chamber, central portions other than the edges of the base cloths 21a and 21b may be connected together by suture.

At the top of the curtain airbag body 21, there is provided an auriform affixing portion 23 arranged projectingly, and the affixing portion 23 is provided with a bolt insertion hole 24 for a stop, such as a bolt. The affixing portion 23 extends above the cover 22 passing through an elongated slot (a slotted opened hole) 25 provided on the upper surface of the cover 22. One side face of the cover 22 is provided with openings 26 arranged in the longitudinal direction of the folded formation of the curtain airbag body 21 at predetermined intervals in a line. Through the openings 26, the curtain airbag body 21 can be visually observed from outside. According to the embodiment, the opening 26 has a substantially elliptical shape elongated in a lengthwise direction, i.e., a direction substantially perpendicular to the longitudinal direction of the curtain airbag body 21. The opening 26 may also be substantially circular, substantially elliptical and elongated in the longitudinal direction, or square. In addition, in a preferable embodiment, the opening 26 can have an elongated elliptical shape so that the plurality of the creases or the overlapped streaks can easily cross one opening, and this shape permits a very straightforward visual observation.

The cover 22 is fabricated by rolling a long and strip-shaped base cloth into a cylinder and by connecting both edges thereof in the longitudinal direction together with suture thread 22a. Within the cover 22 rolled into the cylinder, the folded formation of the curtain airbag body 21 is lead to be the curtain airbag 20.

The suture thread 22a has a strength in which the suture thread 22a is fractured when the curtain airbag body 21 is inflated. As shown in FIGS. 2(a) and 2(b), the cover surrounds the airbag while the airbag is folded and the cover breaks apart to allow the airbag to deploy.

Figure 5:
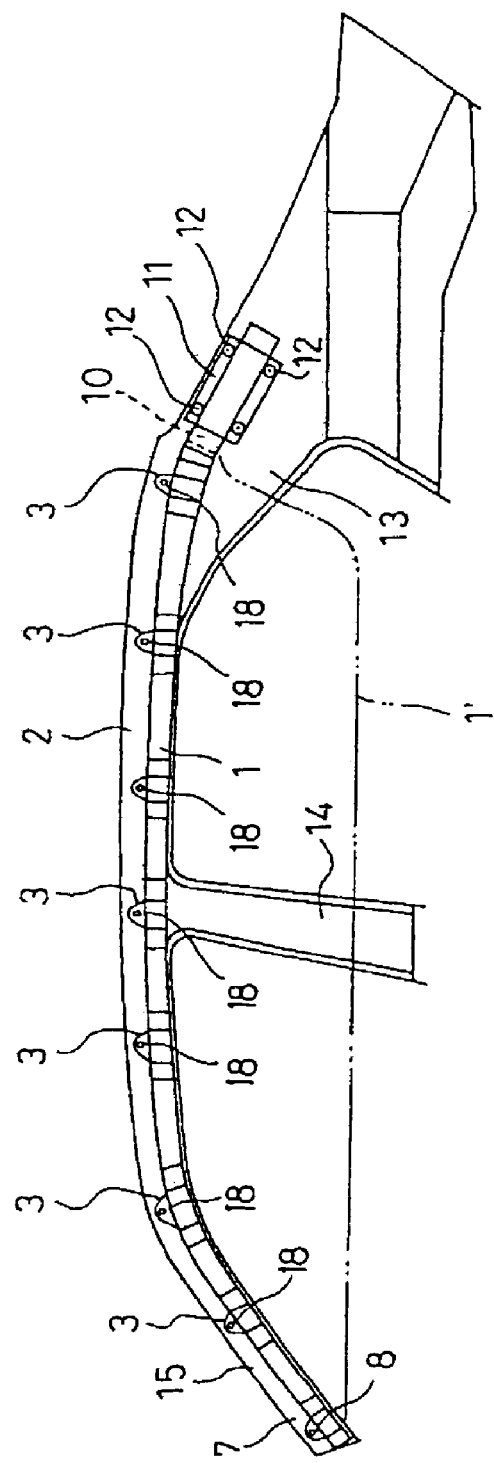
FIG. 5 is a structural view showing an attaching structure of the curtain airbag shown in FIGS. 4(a)–4(c) to a vehicle body when a roof side rail is viewed from the inside of a cabin.

In the curtain airbag 20, in the same way as in the curtain airbag 1 shown in FIG. 5, the affixing portion 23 is attached to a roof side rail of an automobile. In addition, in alternative embodiments, the attached portion of the curtain airbag 20 is not limited to the roof side rail; alternatively, it may be a pillar such as an A pillar or a C pillar, and depending on the circumstances, the curtain airbag 20 may also be attached to a roof.

The curtain airbag 20 attached to the vehicle body is generally covered with a vehicle interior material. The vehicle interior material is allowed to fracture or to extend in the cabin side when the curtain airbag 20 is inflated so as to allow the curtain airbag body 21 to be inflated into the cabin.

At one end of the curtain airbag body 21, an inlet (not shown) of the gas from the inflator is arranged, or an inflator insertion inlet (not shown) is arranged, so that the curtain airbag body 21 is inflated by the gas from the inflator. The curtain airbag body 21 is downwardly extended along a side-face member in the vehicle cabin such as a window so as to receive an upper body of an occupant such as a head and a shoulder.

In the curtain airbag 20, since the curtain airbag body 21 is covered with the cover 22, the curtain airbag body 21 is protected from being worn during transportation or after being attached to the vehicle body. Therefore, the resistance to wear demanded for the curtain airbag body can be alleviated.

Also, in the curtain airbag 20, the curtain airbag body 21 within the cover 22 can be visually and directly observed through the plurality of openings 26 formed on the side surface of the cover 22 in one line, so that the folded and accommodated state of the curtain airbag body 21 within the cover 22 can be visually observed. Accordingly, the operation accommodating the curtain airbag body 21 into the cover 22 and the operation confirming the state of the curtain airbag body 21 after being attached to the vehicle body can be accomplished more quickly.

In the curtain airbag 20, the openings 26 are provided on the side surface of the cover 22 nearly to the cabin, so that even after the curtain airbag is attached to the vehicle body, the state of the curtain airbag body 21 can be visually observed from the cabin through the openings 26, extremely improving the efficiency in the visual observation after the curtain airbag 20 is attached to the vehicle body.

According to the embodiment, as shown in FIG. 1(*a*), through the openings 26, a plurality of the crease lines or the overlapped streaks produced along the creases are visible, enabling working efficiency of the visual observation and the accuracy in confirmation of the curtain airbag body 21 to be improved.

In addition, by providing the plurality of openings 26, efficiency in the operation of attaching the curtain airbag 20 to the vehicle body can be improved.

According to the embodiment described above, only one side surface of the cover 22 is provided with the openings 26; alternatively, they may be provided on both the side surfaces.

Figure 2:
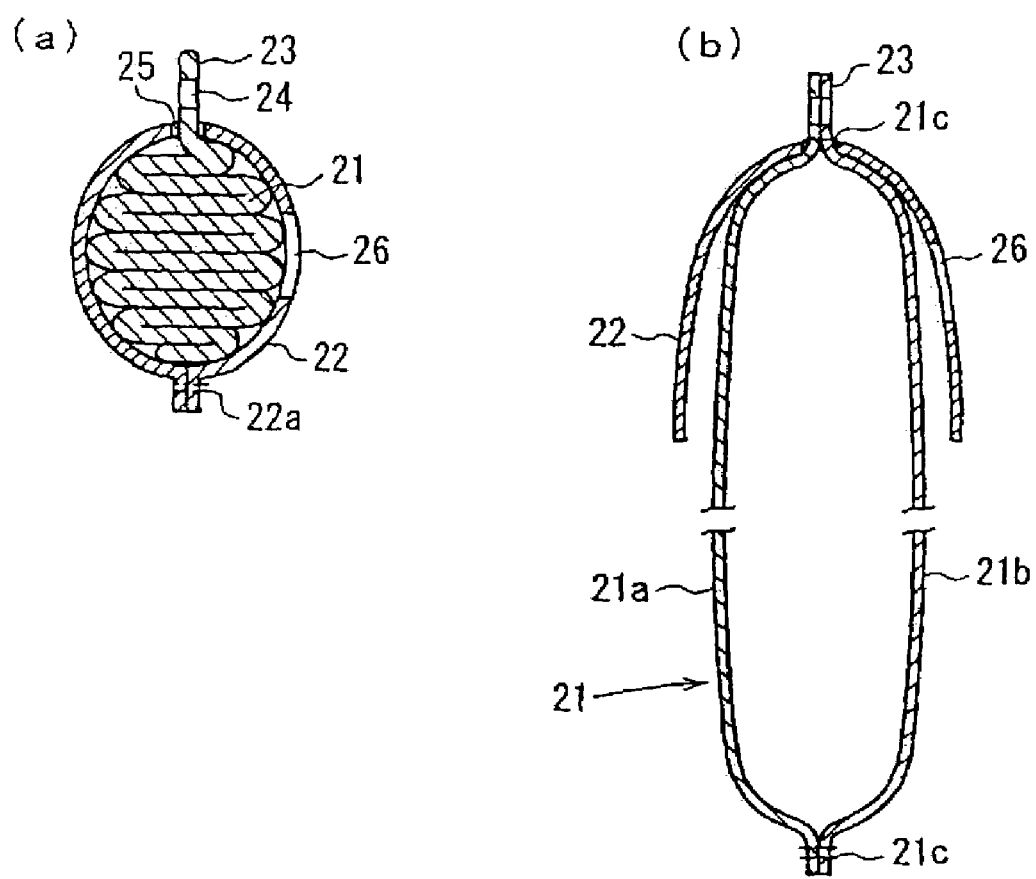
FIG. 2(a) is a cross-sectional view of the curtain airbag at the line II—II of FIG. 1(a)
FIG. 2(b) is a longitudinal sectional view of the curtain airbag when the curtain airbag body is inflated.
Figure 3:
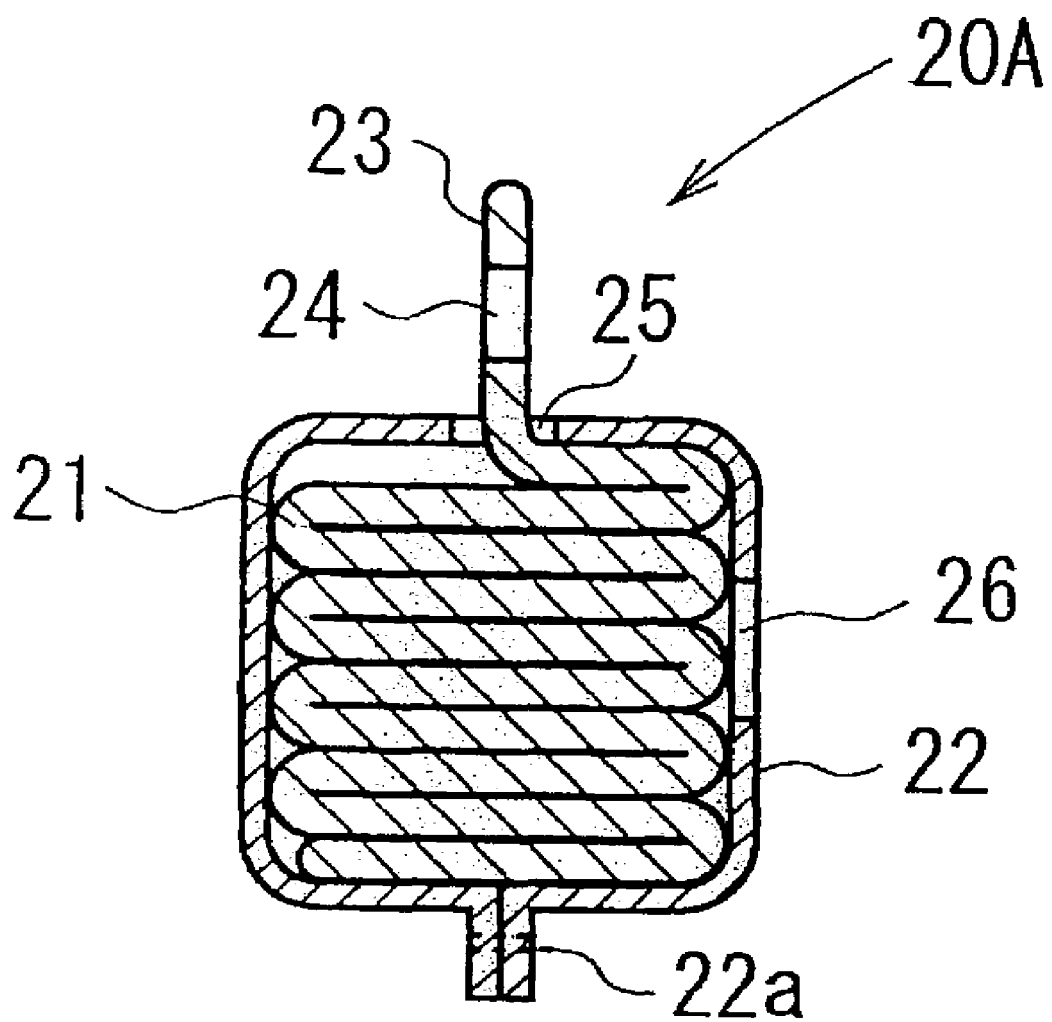
FIG. 3 is a longitudinal sectional view of a curtain airbag according to another embodiment.
Figure 4:
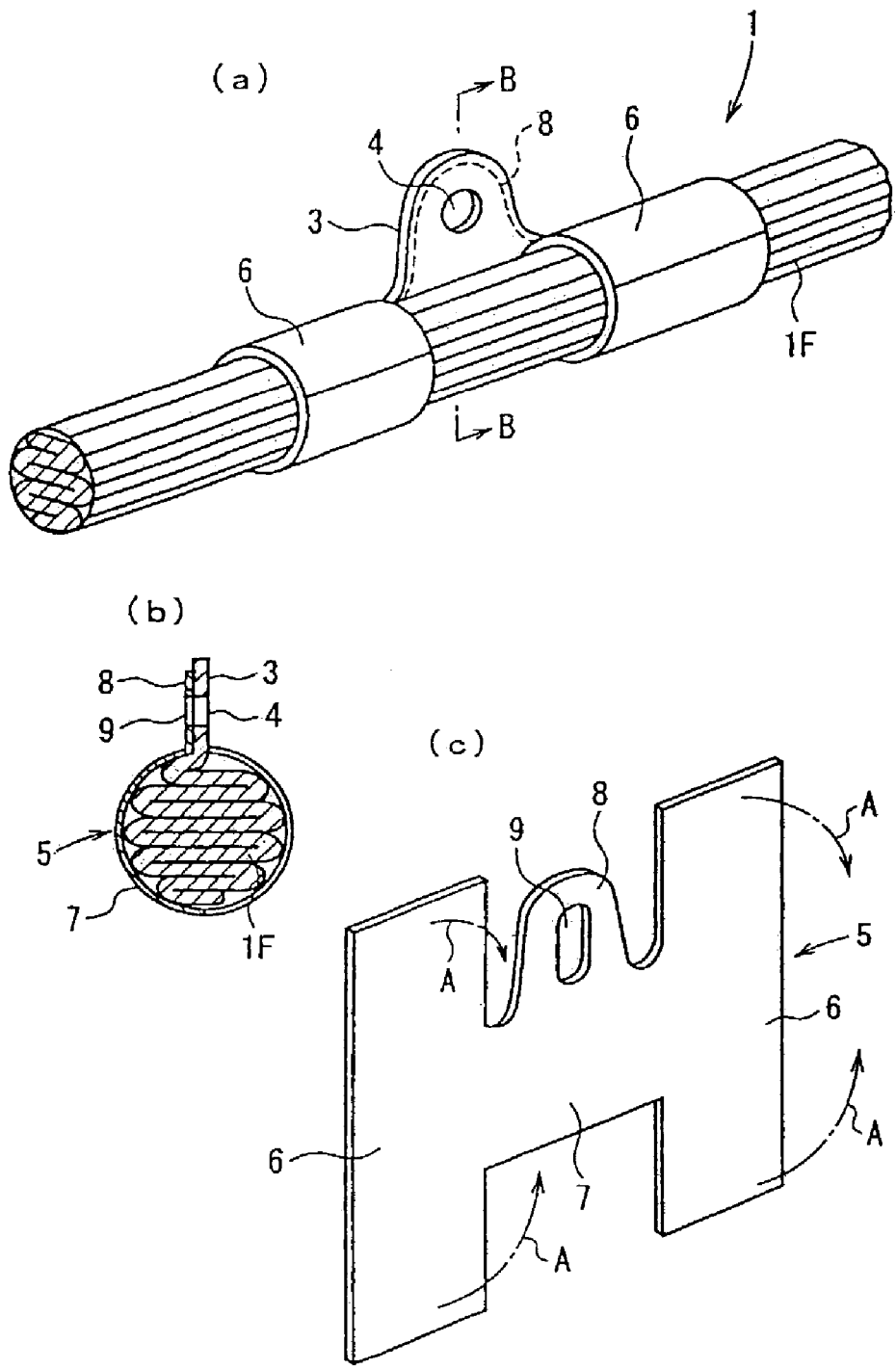
FIG. 4(a) is a perspective sectional view of a conventional curtain airbag.
FIG. 4(b) is a cross-sectional view of the curtain airbag at the line B—B of FIG. 4(a)
FIG. 4(c) is a perspective view of a sheet in the curtain airbag shown in FIGS. 4(a) and 4(b).

According to an embodiment, as shown in FIG. 2(*a*), the cross-sectional shape of the folded formation of the curtain airbag body 21 is substantially elliptical. Alternatively, as shown in FIG. 4(*b*), it may be substantially circular, or as a curtain airbag 20A shown in FIG. 3, the curtain airbag body 21 may be folded to be substantially square.

According to an embodiment of the present invention, when intervals between the openings 26 are excessively small, the coverage rate in area with the cover becomes small, and when the intervals (i.e., spacings) are excessively large, internal observation may be insufficient. In one preferred embodiment, the interval may preferably be about 30 mm to about 70 mm.

If the opening 26 is excessively longer than it is wide, when the folded formation of the curtain airbag body 21 is led into the cylindrical cover 22, the folded formation may be prone to catch in an edge of the opening 26. According to one preferred embodiment, the longitudinal length can be about 20% to about 80% of the height of the folded formation of the curtain airbag body 21. The width of the opening 26 may preferably be about 50% to about 100% of the height.

As described above, in the curtain airbag according to the present invention, through the openings of the cover, the curtain airbag body within the cover can be directly observed, so that the folded and accommodated state in the cover of the curtain airbag body can be visually observed. Therefore, the accommodating of the curtain airbag body within the cover and the confirmation of the state of the curtain airbag body after the curtain airbag is attached to the vehicle body can be speeded up.

While the above provides a full and complete disclosure of the preferred embodiments of the present invention, various modifications, alternate constructions, and equivalents may be employed without departing from the scope of the invention. Therefore, the above description and illustration should not be construed as limiting the scope of the invention, which is defined by the appended claims.

Japan Priority Application 2002-034125, filed on Feb. 12, 2002, including the specification, drawings, claims and abstract, is incorporated herein by reference in its entirety.

The invention claimed is:

1. A curtain airbag comprising:
a foldable curtain airbag body extendable along a side wall of a vehicle cabin; and
a cover for covering the folded curtain airbag body, the cover including a top surface, a bottom surface, a first side surface facing a vehicle occupant and a second side surface opposite the first side surface,
wherein the cover is provided with a plurality of openings formed at predetermined intervals in the longitudinal direction of the curtain airbag for observing the folded curtain airbag body within the cover, the openings being located only along the first or second side surface of the cover when the airbag body is in the folded stated, and
wherein the cover is configured to break apart to allow the airbag to deploy.

2. The curtain airbag according to claim 1, wherein the openings are arranged on a surface being visible from the cabin in a state that the curtain airbag is attached to a vehicle body.

3. The curtain airbag according to claim 1, wherein the openings are arranged so as to overlap with at least one streak crease line in the longitudinal direction of the curtain airbag body.

4. The curtain airbag according to claim 1, wherein the openings are longer than are wide in a direction crossing the longitudinal direction of the curtain airbag body.

5. The curtain airbag according to claim 1, wherein the predetermined intervals between the openings are about 30 mm to about 70 mm.

6. The curtain airbag according to claim 1, wherein the cover further includes a slotted opening only on the top surface of the cover.

7. The curtain airbag according to claim 6, wherein the curtain airbag body includes an auriform affixing portion structured to extend through the slotted opening of the cover.

8. The curtain airbag according to claim 7, wherein the affixing portion is attachable to a portion of the cabin.

9. The curtain airbag according to claim 1, wherein the curtain airbag body is folded to be substantially square in cross section.

10. The curtain airbag according to claim 1, wherein a longitudinal length of each of the plurality of openings is about 20% to about 80% of a height of the folded airbag curtain body.

11. The curtain airbag according to claim 1, wherein a width of each of the plurality of openings is about 50% to about 100% of a height of the folded airbag curtain body.

12. An airbag for a sidewall of a vehicle, comprising:
a folded airbag extending along the side wall of the vehicle; and
a cover for covering the folded airbag, the cover substantially surrounding the airbag and substantially extending about a longitudinal length of the folded airbag, the cover including a top surface, a bottom surface, a first side surface facing a vehicle occupant and a second side surface opposite the first side surface,
wherein the cover includes a plurality of openings spaced at intervals in the longitudinal direction of the airbag for observing the folded airbag within the cover, the openings being located only along the first or second side surface of the cover when the airbag body is in the folded stated, and
wherein the cover is configured to break apart to allow the airbag to deploy.

13. The airbag according to claim 12, wherein the cover comprises a shaped cloth.

14. The airbag according to claim 13, wherein the cover is cylindrical.

15. The airbag according to claim 12, wherein the openings are spaced apart by about 30 mm to about 70 mm.

16. The airbag according to claim 12, wherein each of the openings comprises an elongated elliptical shape.

17. The airbag according to claim 12, wherein a longitudinal length of each of the plurality of openings is about 20% to about 80% of a height of the folded airbag.

18. The airbag according to claim 12, wherein a width of each of the plurality of openings is about 50% to about 100% of a height of the folded airbag.

19. An airbag device comprising:
an airbag according to claim 1; and
an inflator for inflating the airbag.

20. An airbag device comprising:
an airbag according to claim 12; and
an inflator for inflating the airbag.

* * * * *